(12) United States Patent
Rives et al.

(10) Patent No.: US 7,771,567 B2
(45) Date of Patent: Aug. 10, 2010

(54) SALT WATER DISTILLATION SYSTEM

(76) Inventors: Michael L. Rives, Box 270, Linden La., Kirksey, KY (US) 42054; James O. Riley, 208 W. Willow Dr., Mayfield, KY (US) 42066

( * ) Notice: Subject to any disclaimer, the term of this patent is extended or adjusted under 35 U.S.C. 154(b) by 1009 days.

(21) Appl. No.: 11/500,377

(22) Filed: Aug. 8, 2006

(65) Prior Publication Data
US 2007/0051611 A1    Mar. 8, 2007

Related U.S. Application Data

(60) Provisional application No. 60/713,351, filed on Sep. 2, 2005.

(51) Int. Cl.
*B01D 1/18* (2006.01)
*B01D 1/20* (2006.01)
*B01D 3/02* (2006.01)
*C02F 1/12* (2006.01)

(52) U.S. Cl. .......... 202/176; 134/68; 134/184; 122/436; 159/48.1; 159/DIG. 15; 202/185.3; 202/236; 202/267.1; 203/10; 203/22; 203/90; 210/180; 210/768

(58) Field of Classification Search .......... 159/3, 159/28.6, 44, 48.1, DIG. 1, DIG. 15; 202/160, 202/176, 177, 185.3, 185.5, 236, 267.1; 203/2, 10, 22, 27, 90, DIG. 8; 134/68, 184; 122/436; 210/180, 768
See application file for complete search history.

(56) References Cited

U.S. PATENT DOCUMENTS

| | | |
|---|---|---|
| 287,909 A | 11/1883 | Cook |
| 554,138 A | 2/1896 | Negbaur et al. |
| 1,862,224 A | 6/1932 | Langley |
| 2,332,294 A | 10/1943 | Bohmfalk |
| 2,803,591 A | 8/1957 | Coanda et al. |
| 3,147,598 A | 9/1964 | Wilson |
| 3,163,587 A | 12/1964 | Champe |

(Continued)

FOREIGN PATENT DOCUMENTS

FR    2 546 873    12/1984

(Continued)

OTHER PUBLICATIONS http://au.geocities.com/daveclarkecb/windelecdesal.html "Wind Farms, the Electricity Grid and Desalination in Australia" Retrieved on Jun. 20, 2005.

(Continued)

*Primary Examiner*—Virginia Manoharan
(74) *Attorney, Agent, or Firm*—Richard C. Litman

(57) ABSTRACT

The salt water distillation system includes a sprinkler to form a mist of salt water over a distillation plate. The distillation plate is heated by applying electrical current to a heating coil. The steam is transferred to a condensation chamber and condensed fresh water is collected. During the desalination process, salt impurities are deposited on the hot distillation plate. A sludge remover, i.e., a steam head and movable ram, is provided to clean the distillation plate of the salt impurities. An exhaust fan is provided to cool fresh water condensate and lower air pressure in the system. Heat transferred from the steam during condensation is used to pre-heat the salt water to increase efficiency of the system.

15 Claims, 2 Drawing Sheets

U.S. PATENT DOCUMENTS

| | | | |
|---|---|---|---|
| 3,206,379 A | | 9/1965 | Hill |
| 3,257,291 A | | 6/1966 | Gerber |
| 3,278,396 A | | 10/1966 | Parson |
| 3,300,393 A | | 1/1967 | Fisher |
| 3,312,600 A | | 4/1967 | Morton |
| 3,522,151 A | | 7/1970 | Dismore |
| 3,557,863 A | | 1/1971 | Becker |
| 3,822,740 A | | 7/1974 | Hackett |
| 3,824,154 A | | 7/1974 | Takada et al. |
| 3,871,180 A | | 3/1975 | Swanson |
| 3,948,734 A | | 4/1976 | Kohl et al. |
| 4,038,129 A | | 7/1977 | Wreszinski |
| 4,230,531 A | | 10/1980 | Fernandopulle |
| 4,235,680 A | * | 11/1980 | Diggs .................. 203/2 |
| 4,271,790 A | | 6/1981 | Ahmed et al. |
| 4,285,776 A | | 8/1981 | Atwell |
| 4,292,540 A | | 9/1981 | Thompson et al. |
| 4,487,659 A | * | 12/1984 | Stark .................. 202/172 |
| 4,664,752 A | | 5/1987 | Zievers et al. |
| 5,112,446 A | | 5/1992 | Vallon |
| 5,159,884 A | * | 11/1992 | Malick .................. 110/223 |
| 5,207,928 A | | 5/1993 | Lerner |
| 5,312,028 A | * | 5/1994 | Hume .................. 222/326 |
| 5,384,489 A | | 1/1995 | Bellac |
| 5,650,050 A | | 7/1997 | Kaufmann |
| 6,293,121 B1 | | 9/2001 | Labrador |
| 6,500,216 B1 | * | 12/2002 | Takayasu .................. 23/303 |
| 6,635,149 B1 | * | 10/2003 | Campbell et al. .......... 202/160 |
| 6,699,369 B1 | | 3/2004 | Hartman et al. |
| 2003/0228195 A1 | | 12/2003 | Mizutani |
| 2004/0055866 A1 | | 3/2004 | Levine |
| 2005/0011743 A1 | | 1/2005 | Hernandez et al. |

FOREIGN PATENT DOCUMENTS

| | | |
|---|---|---|
| JP | 61-222590 | 10/1986 |
| JP | 61-254287 | 11/1986 |
| JP | 3000182 | 1/1991 |
| JP | 2004-181440 | 7/2004 |
| WO | WO 03/704644 | 8/2003 |

OTHER PUBLICATIONS http://www.ingentaconnect.com/content/mscp/wind/2004/00000028/00000004/art00010 "Desalination by Wind Power" Retrieved on Jun. 20, 2005.

http://www.wrrc.hawaii.edu/research/project_liu/desalination.html "Desalination of Brackish Water by Reverse Osmosis" Retrieved on Jun. 20, 2005.

http://www.esru.strath.ac.uk/EandE/Web_sites/98-9/offshore/fresh.htm "Freshwater Produced by Desalination Processes" Retrieved on Jun. 20, 2005.

http://www.oas.org/usde/publications/Unit/oea59e/ch21.htm "Desalination by Distillation" Retrieved on Jul. 28, 2005.

http://www.dh.co.kr/English/product/pro4_main.html "Multi-Stage Flash Distillation" Retrieved on Jul. 28, 2005.

* cited by examiner

US 7,771,567 B2

SALT WATER DISTILLATION SYSTEM

CROSS-REFERENCE TO RELATED APPLICATION

This application claims the benefit of U.S. Provisional Patent Application Ser. No. 60/713,351, filed Sep. 2, 2005.

BACKGROUND OF THE INVENTION

1. Field of the Invention

The present invention relates to water supply systems, and particularly to a salt water distillation system for producing fresh water from salt water, such as water from the ocean.

2. Description of the Related Art

In many areas of the country and around the world, fresh water supplies are scarce or are dwindling. Salt water (also sometimes referred to herein as saltwater) is not suitable for drinking, for irrigation, or other purposes without further processing. Salt water distillation systems have been known for centuries. One well known process comprises the evaporation of salt water, the condensation of the evaporated water, the precipitation of the condensed water, and the collection of the precipitated water.

The aforementioned process may be sped up by increasing heat in the evaporation process and decreasing ambient temperature during the condensation process. Yet, since the cost and amount of energy needed to distill salt water into fresh water remains extremely high, there remains a continuing need to improve the efficiencies involved in the distillation process. French Patent No. 2546873, issued December 1984, WIPO Patent No. WO 03/0704644, issued August 2003, Japanese Patent No. 2004-181449, issued July 2004, Japanese Patent No. 61-222590, issued October 1986, Japanese Patent No. 61-254287, issued November 1986, and Japanese Patent No JP3000182, issued January 1991, do not appear to disclose or suggest either individually or in combination all of the features of the present invention.

Thus, a salt water distillation system solving the aforementioned problems is desired.

SUMMARY OF THE INVENTION

The salt water distillation system distills water utilizing a sprinkler system to sprinkle salt water onto a desalination surface, i.e., a hot distillation plate. The distillation plate is heated by applying electrical current to a heating coil. During the desalination process, salt impurities are deposited on the distillation plate. A sludge remover, i.e., a steam cleaning head, is provided to clean the distillation plate of the salt impurities. An exhaust fan is provided to assist in cooling the fresh water. Fresh air is circulated through an air inlet in thermal contact with distillation steam cooling coils to provide more steam cooling during the condensation phase. A steam capture chamber traps fresh water steam, while the condenser coils, i.e., steam cooling coils, cool the steam to produce fresh water to be stored for later use.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
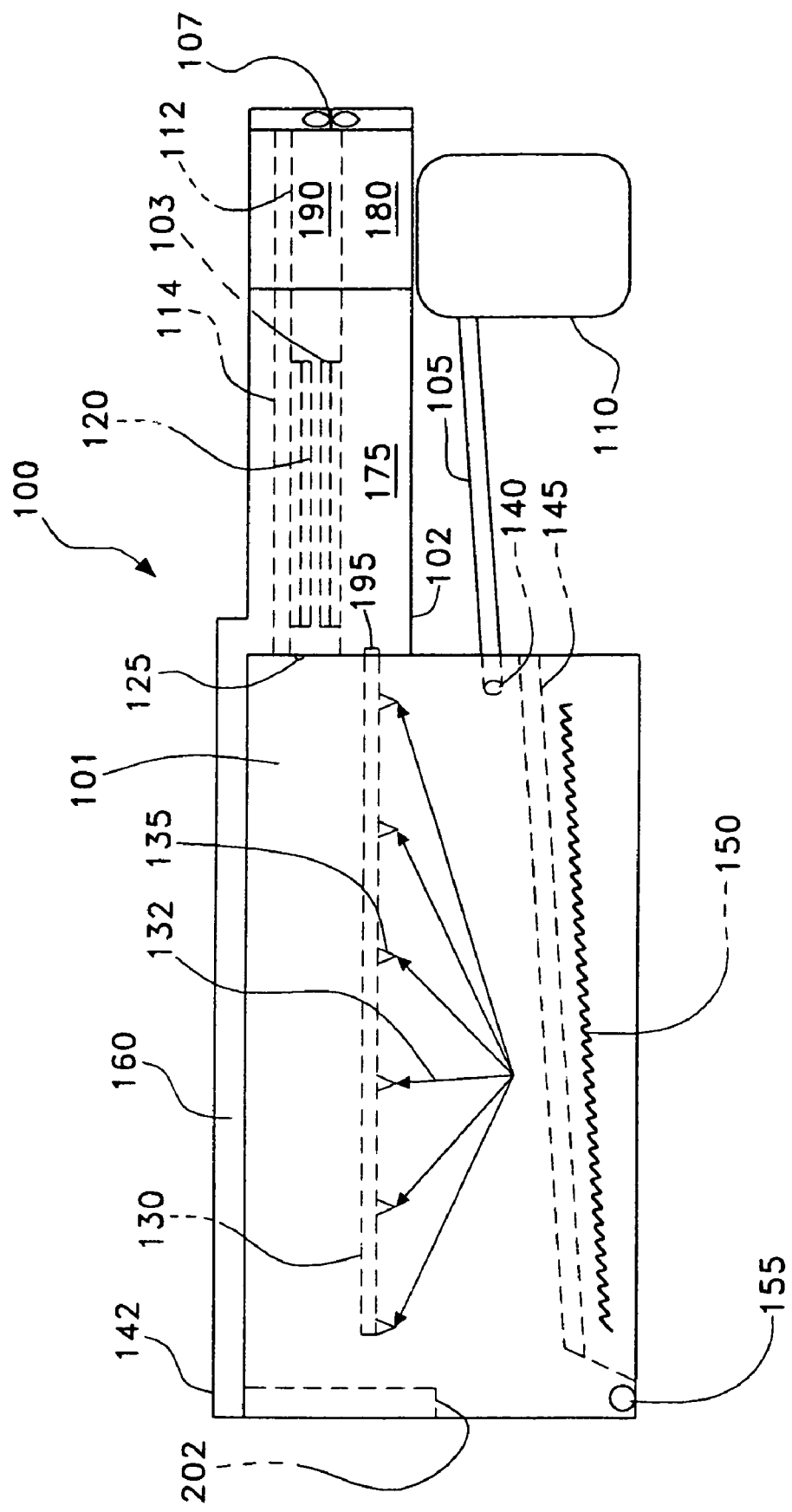
FIG. 1 is a diagrammatic side view of the salt water distillation system according to the present invention.
Figure 2:
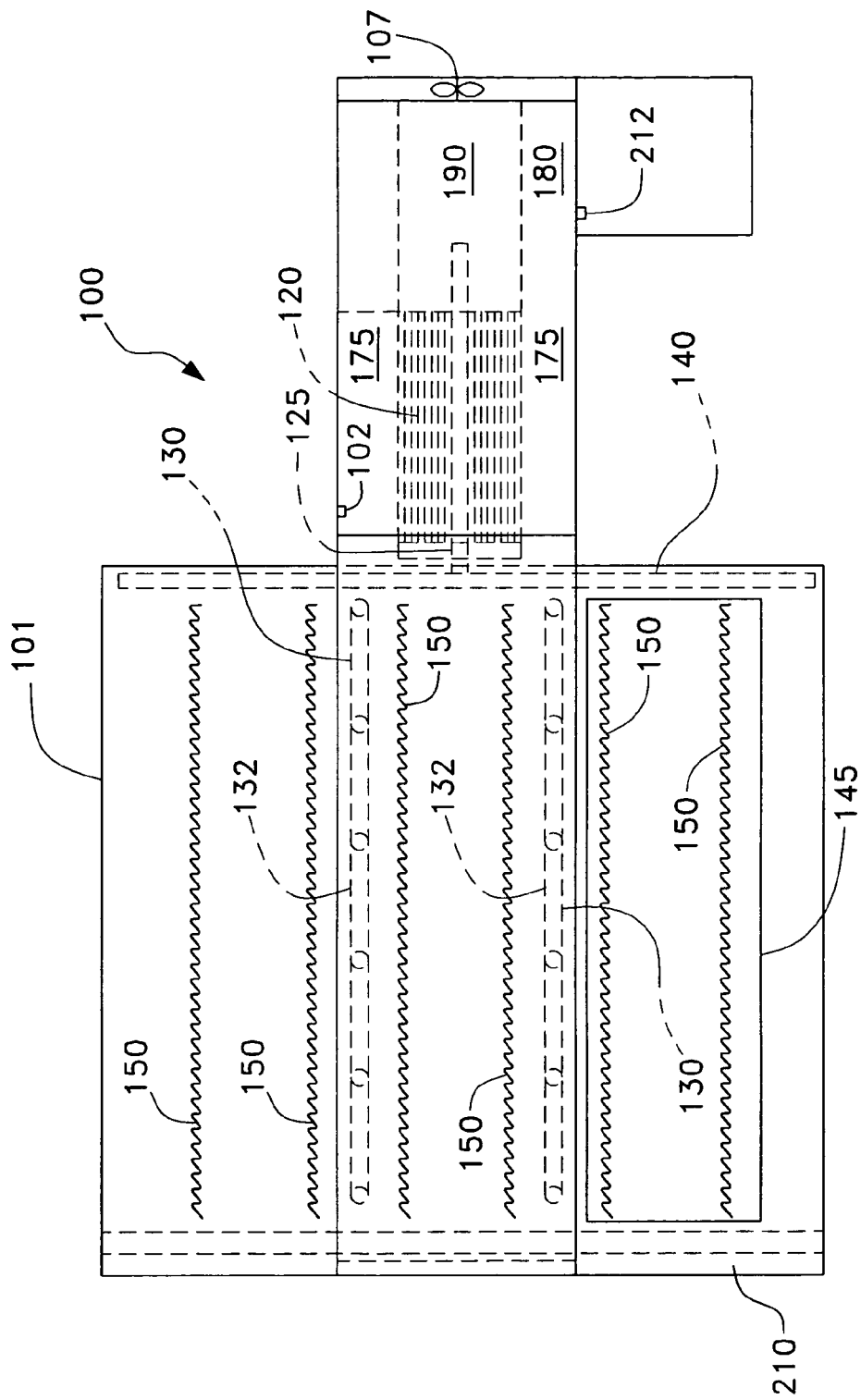
FIG. 2 is a diagrammatic top view of the salt water distillation system according to the present invention.

Referring to FIGS. 1 and 2, the present invention is a salt water distillation system 100 that provides for the creation of steam from heated salt water in a steam chamber 101, and for cooling the steam in a cooling tray 103 to condense the water, purified of salt content. The steam chamber 101 is preferably constructed from welded steel plating. A distillation surface, preferably comprising a thin metal plate 145, is provided. The metal plate 145 is preferably formed from steel, stainless steel, brass or copper. Advantageously, the metal distillation plate 145 is corrugated, thus providing more surface area for heat transfer for a given system dimension.

Moreover, the metal distillation plate 145 is elevated at one end so that any particulate and sludge build-up will have a natural tendency to slide off of the plate 145 and into a sludge tray 210 leading into a sludge removal hole 155. Sludge deposited into sludge tray 210 may be expelled from the chamber 101 via sludge removal hole 155 by any available sludge transporting means, such as, but not limited to, a screw or spiral conveyor.

Preferably, a heating system, such as electric heating coils 150, is provided to maintain the distillation plate 145 at a temperature of approximately 400° F. The distillation system 100 advantageously provides for steady state operation of the electric heating coils 150. It is within the scope of the present invention to provide electrical power for the heating coils from any desired energy source, such as coal, solar, wind and natural gas powered electrical generators.

In the salt water distillation system 100, pre-heated salt water is applied to the distillation plate 145 through sprinkler or other misting device, such as sprinkler supply line 130 in combination with rotational sprinkler head 132 and control valves 135. Rapid rotation of sprinkler head 132 can preferably be achieved by increasing water pressure through the supply line 130 at the salt water transfer means 195, which is disposed between the supply line 130 and a salt water inlet pipe 180.

The present invention provides for an escape route, i.e., steam outlet pipe 125 for the steam created when a mist of water distributed into the steam chamber 101 by the sprinkler heads 135 comes into contact with the hot distillation plate 145. Steam outlet pipe 125 conveys the steam into an enclosed condensation area comprising steam cooling coils 120 for heat exchange to condense the steam to provide fresh water, and a fresh water collecting cooling tray 103 to provide a fresh water collecting means.

Steam cooling coils 120 are in thermal contact with heated air inlet 160. Preferably, heated air inlet 160 cycles air, which has been heated by steam cooling coils 120, into the steam chamber 101 by heated air transfer means 202. The heated air inlet 160 is thermally insulated from the surrounding environment with thermal insulation 142. Preferably thermal insulation 142 also encompasses the remainder of steam chamber 101 for added thermal isolation from the environment.

Steam coming in thermal contact with the cooling coils 120 is rapidly condensed into hot water is collected in the cooling tray 103. As stated above, the salt water introduced into the sprinkler supply line 130 is pre-heated by recycling the heat transferred from the steam to the cooling coils 120 in order to lower energy costs and improve efficiency of the salt water distillation system 100.

Some of the salt water pre-heating is also achieved by thermal exchange from the distilled hot water in the cooling tray 103, since cooling tray 103 is designed to facilitate heat transfer from the hot, salt-purified water to the cooler salt water in a heat transfer area 175 of an inlet water tank 102.

The design of the enclosure holding cooling tray 103 and cooling coils 120 provides for an opening to allow the condensed fresh water to escape through a fresh water outlet pipe 190. Optionally, the opening can be made big enough to allow air in the condensation area to escape as well. An enclosed area in the immediate vicinity of the fresh water outlet pipe 190 is ventilated by fan 107 to assist further cooling of the fresh water in the pipe 190 and to reduce barometric pressure inside the condensation area.

A steam cleaning head 140 mounted on a movable steam ram 105 is provided to assist in removal of sludge deposits on the distillation plate 145. The ram 105 is disposed in the steam chamber 101 so that the steam cleaning head 140 may be moved above and along the distillation plate 145 as the steam is forcibly ejected under control of steam cleaning controls 110 during a cleaning cycle.

It is to be understood that the present invention is not limited to the embodiment described above, but encompasses any and all embodiments within the scope of the following claims.

We claim:

1. A salt water distillation system, comprising:
   a steam chamber;
   a sprinkler system disposed in the steam chamber;
   a salt water supply line connected to a salt water inlet pipe for delivering salt water to the sprinkler system;
   a distillation surface comprising a distillation plate disposed inside the steam chamber below the sprinkler system;
   electric heating coils for heating the distillation surface to form steam from salt water released as a mist by the sprinkler system and for maintaining the temperature of the distillation surface at approximately 400° F.;
   a movable steam ram disposed over the distillation plate for removal of deposits from the distillation plate, wherein the movable steam ram includes a steam cleaning head, the steam cleaning head being mounted on the movable steam ram, the ram being disposed in the steam chamber so that the steam cleaning head may be moved above and along the distillation plate, steam cleaning controls, the steam cleaning controls being provided to control forcible ejection of steam from the steam cleaning head during the distillation plate cleaning cycle;
   a condensation chamber, wherein the condensation chamber further comprises a steam cooling coils for heat exchange to condense the steam to provide fresh water;
   a steam outlet pipe for transferring steam generated in the steam chamber to the condensation chamber;
   a cooling tray for collecting distilled fresh water from the condensation chamber;
   a fresh water outlet pipe; an exhaust fan to assist further cooling of the fresh water in the fresh water outlet pipe; and,
   a heat transfer recycling system for transferring heat generated during condensation of the steam to pre-heat salt water supplied to the sprinkler system, the recycling system further including a heated air inlet in thermal contact with the steam cooling coils; and, a distilled hot water cooling tray being disposed proximate to a heat transfer area of an inlet water tank to facilitate pre-heating of the salt water in the inlet water tank.

2. The salt water distillation system according to claim 1, wherein the steam chamber is constructed from welded steel plating.

3. The salt water distillation system according to claim 1, wherein the distillation plate comprises a metal distillation plate.

4. The salt water distillation system according to claim 3, wherein the distillation plate is formed from steel.

5. The salt water distillation system according to claim 3, wherein the distillation plate is formed from stainless steel.

6. The salt water distillation system according to claim 3, wherein the distillation plate is formed from brass.

7. The salt water distillation system according to claim 3, wherein the distillation plate is formed from copper.

8. The salt water distillation system according to claim 3, wherein the distillation plate is corrugated to provide a greater surface area for heat transfer for a given system dimension.

9. The salt water distillation system according to claim 3, wherein the distillation plate is elevated at one end so that any particulate and sludge build-up has a natural tendency to slide off of the distillation plate.

10. The salt water distillation system according to claim 9, further comprising: a sludge tray disposed proximate to the distillation plate to collect sludge deposited by the distillation plate; and, the sludge tray leading into a sludge removal hole, whereby sludge deposited into the sludge tray maybe transported for expulsion via the sludge removal hole.

11. The salt water distillation system according to claim 10, further comprising: a conveyor disposed on the sludge tray to facilitate the expulsion of the sludge therefrom.

12. The salt water distillation system according to claim 1, wherein the electric heating coils have the capability to provide steady state heating operation.

13. The salt water distillation system according to claim 1, wherein the sprinkler system further comprises a plurality of sprinkler heads and control valves.

14. The salt water distillation system according to claim 13, wherein the sprinkler heads are rotational and capable of rapid rotation when supplied by an increasing water pressure through the supply line.

15. The salt water distillation system according to claim 1, further comprising: an enclosed area near the fresh water outlet pipe; the enclosed area being ventilated by the fan.

* * * * *